United States Patent [19]
Kakuta

[11] Patent Number: 5,165,234
[45] Date of Patent: Nov. 24, 1992

[54] APPARATUS FOR DRIVING A TURBOSUPERCHARGER

[76] Inventor: Yoshiaki Kakuta, 1-8-1, Hamakawado, Kasukabe-Shi, Saitama-Ken, Japan

[21] Appl. No.: 665,887

[22] Filed: Mar. 7, 1991

[30] Foreign Application Priority Data

Mar. 7, 1990 [JP] Japan .................................. 2-55901

[51] Int. Cl.⁵ .......................................... F02B 33/44
[52] U.S. Cl. ...................... 60/605.1; 60/316; 60/612
[58] Field of Search ............. 60/605.1, 614, 316, 60/319, 324, 280, 612

[56] References Cited

U.S. PATENT DOCUMENTS

| | | | |
|---|---|---|---|
| 4,418,532 | 12/1983 | Momose et al. | 60/316 |
| 4,548,039 | 10/1985 | Dinger et al. | 60/606 |
| 4,864,825 | 9/1987 | Kakuta | 60/319 |
| 4,905,633 | 5/1988 | Kakuta | 123/41.64 |
| 4,909,034 | 7/1988 | Kakuta | 60/324 |
| 4,926,638 | 6/1988 | Kakuta | 60/319 |

FOREIGN PATENT DOCUMENTS

1-195925 8/1989 Japan .

Primary Examiner—Richard A. Bertsch
Assistant Examiner—Charles G. Freay
Attorney, Agent, or Firm—Jacobson, Price, Holman & Stern

[57] ABSTRACT

Apparatus for driving a turbosupercharger for an internal combustion engine wherein a negative pressure is generated by accelerating the exhaust gas flow. A turbine (40) is driven by the negative pressure generator (30) and a supercharging turbine (50) is operated by the turbine (40), so that as the suction air is pressurized beforehand, the energy of the exhaust gas flow acts on the turbine (40) by connecting the inlet of the turbine (40) to an exhaust system pipe (20). A low-pressure suction air flow acts on the downstream side of the turbine. In this way, the exhaust gas flow discharged to the turbine outlet is absorbed, and the turbine (40) is driven by the energy of the exhaust gas which flows through the exhaust system pipe (20) as well as by suction force of a powerful negative pressure, which is generated separately. A negative-pressure generator (30) is provided at the downstream end of the exhaust system pipe to generate the suction force.

4 Claims, 4 Drawing Sheets

APPARATUS FOR DRIVING A TURBOSUPERCHARGER

BACKGROUND OF THE INVENTION

The present invention relates generally to turbosupercharges used for internal combustion engines, and specifically to the means for driving turbosupercharges in which a turbine is driven by the suction energy generated at the exhaust system.

Conventional turbosupercharges are driven by an exhaust turbine which in turn is driven by direct utilization of the kinetic energy of the exhaust gas. The exhaust turbine is driven by high temperature high pressure gas flow which is exhaust from the cylinder combustion chamber, and suction air is supercharged by a supercharging turbine coupled thereto.

In conventional systems of this kind, the exhaust turbine needs to withstand the high temperature and high pressure exhaust gas. As a result, high manufacturing technologies are required, and component prices tend to be high. Moreover, the supercharging turbine is also heated by the high temperature of the exhaust turbine, and as a result, the charging efficiency is reduced. Therefore, because the turbosupercharger needs to be cooled down, the mechanism has to be made even more complicated.

To solve these problems, the inventor developed a means by which to drive the turbosupercharger by means of a negative-pressure that is generated when the exhaust gas flow is accelerated before it is discharged into the atmosphere. A patent application (Laid open Hei 1-195925) has already been submitted for a part of this technology.

BRIEF SUMMARY OF THE INVENTION

The present invention considers the kinetic energy of the exhaust gas flow. A powerful negative-pressure is generated by recovering this kinetic energy from exhaust gas flow immediately after the combustion chamber, where the velocity is at its highest. The turbosupercharger is then driven by utilizing the suction power of the negative-pressure. In other words, the present invention adopts a system to rotate the driving turbine by using the outside airflow absorbed by the generated negative-pressure. The driving turbine, therefore, is not exposed at all to any exhaust gas, as is the case with exhaust turbines of the prior art, and is also free from the influence of high heat. The supercharging turbine can accordingly take in, compress, and send the outside air, while it remains cool, to the combustion chamber, exerting a feature capable of porforming supercharging at a high charging efficiency without the negative influence of reduction in density caused by the rise in temperature. The absorbed outside air, however, has a low energy in general, and the power obtained from kinetic energy is weak. Therefore, it is expected that efficiency can be further improved if this shortcoming is addressed.

The invention therefore focuses on further enhancing utilization of the energy in the exhaust gas flow. Through tests, the inventor found that if it is possible to utilize an exhaust gas flow which is almost free from thermal influence for the air flow that passes through the driving turbine, the energy utilization efficiency is higher than when outside air is taken in as it stands.

Although negative-pressure is the main driving power, the object of the present invention consists in utilizing the kinetic energy of the exhaust gas flow, while sidestepping the adverse effects of high temperature. This energy is used to operate the driving turbine, which in turn drives a turbosupercharger. Efficiency is thereby higher than in the case where the driving turbine is operated solely by the suction energy induced by a negative-pressure generator.

The purpose described above has been attained by a unique system for driving a turbosupercharger in an internal combustion engine. The system includes an exhaust system pipe that discharges into the atmosphere the exhaust gas flow that is exhausted from the combustion chamber. A negative pressure generator is provided at the lowermost downstream of the exhaust gas system pipe to accelerate the flow of exhaust gas from the exhaust gas system and to thereby generate a negative pressure. The exhaust gas flow, whose kinetic energy is attenuated downstream from the exhaust system, drives the turbine as follows: the gas is introduced to the turbine inlet via an intake pipe and is absorbed into a negative pressure generator via a suction pipe whose top end is connected to the turbine outlet. The supercharging turbine is then driven by the first turbine to supercharge air that feeds into the combustion chamber.

In connection with the structure mentioned above, the inlet and outlet of the supercharging turbine are connected to the exhaust system and the negative pressure generator, respectively. The turbine inlet must be connected to the exhaust system pipe downstream where the kinetic energy is attenuated via an inlet pipe. Downstream, where the kinetic energy is attenuated, the exhaust gas temperature is not high, and therefore the influence on the turbine blades is markedly lower than that on the exhaust turbine. This downstream area should be downstream from the catalyzer, preferably immediately in front of or at the rear of the exhaust muffler.

The turbosupercharger of this invention is operated entirely by the main suction force induced by the negative pressure generator and therefore, the energy of the exhaust gas flow is not a primary driving source. Although the ratio between the suction force and the energy of the exhaust gas flow cannot be determined precisely, it is assumed to be from 9:1 to 6:4.

BRIEF DESCRIPTION OF THE DRAWINGS

The invention will now be described in detail with reference to the accompanying drawings which show the equipment relating to the present invention and wherein.

DETAILED DESCRIPTION OF PREFERRED EMBODIMENTS

Figure 1:
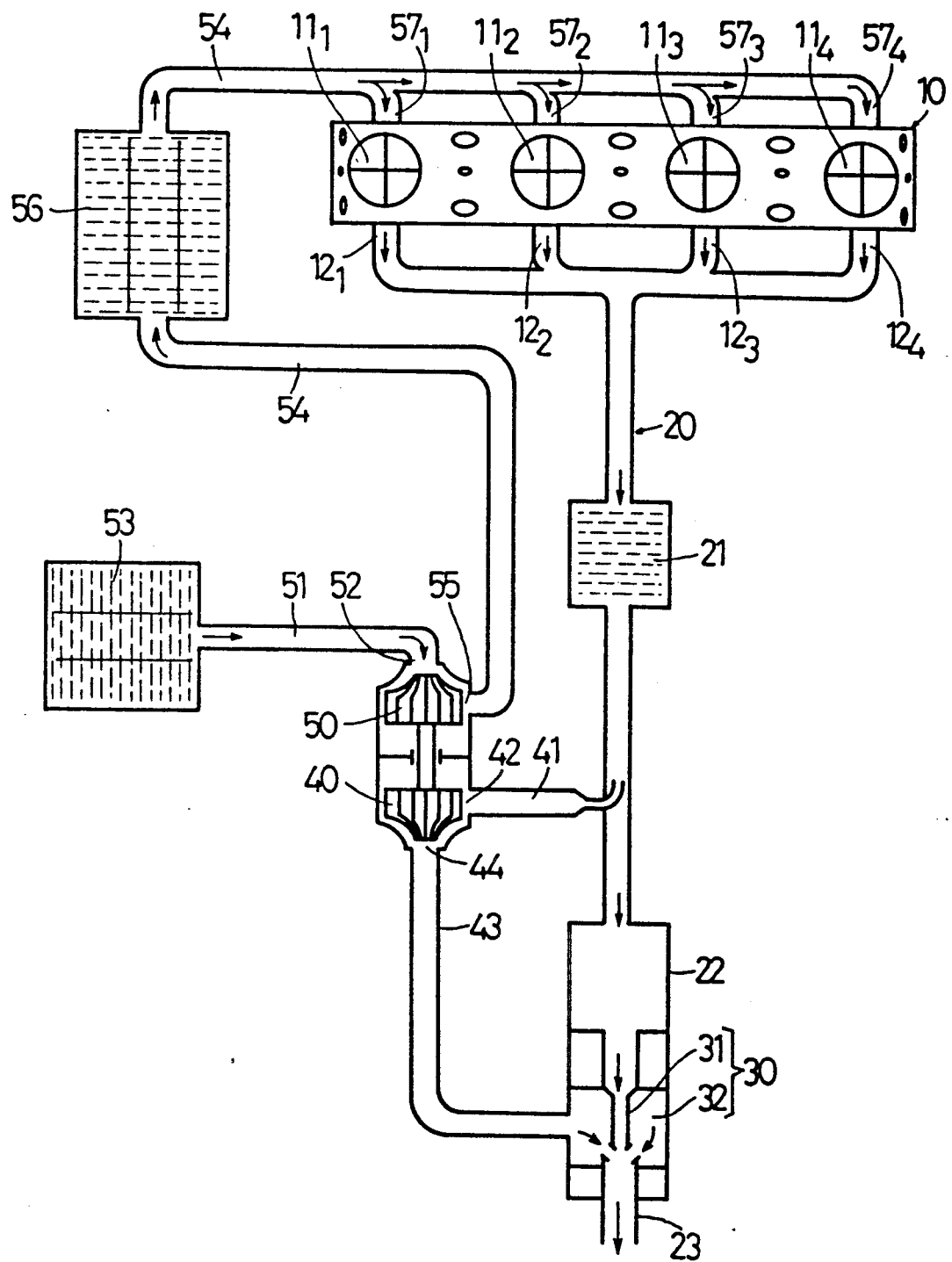
FIG. 1 is a schematic drawing of the first embodiment of the invention.

In the drawings, 10 indicates the internal combustion engine; $11_1$, $11_2$, $11_3$, and $11_4$, indicate the combustion chambers thereof; $12_1$, $12_2$, $12_3$, $12_4$ indicate the exhaust pipes located immediately after the exhaust openings of the combustion chamber; 20 indicates a single exhaust system pipe downstream of $12_1$–$12_4$; 21 indicates a catalytic converted; and 22 indicates an exhaust muffler. Flows of exhaust gas discharged from the combustion chambers $11_1$–$11_4$ have a supersonic flowrate immediately after the discharge, and the flowrate is gradually slowed down by the load of the exhaust system pipe 20 of the catalytic converter 21, and of the exhaust muffler 22. For example, in the case of a 4-cycle gasoline engine, the flow rate is stabilized at a speed of 100 to 200 m/sec.

Figure 3:
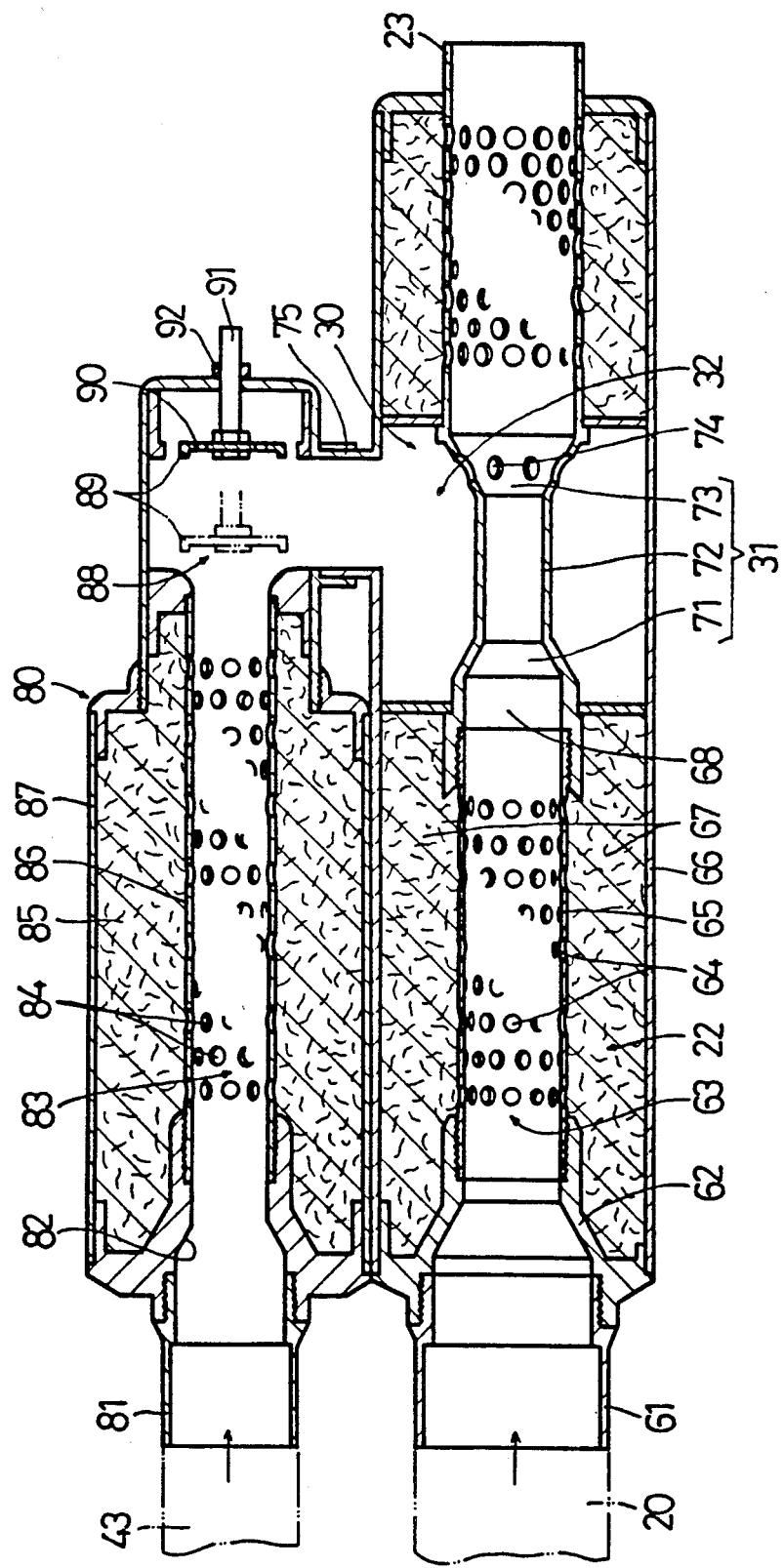
FIG. 3 is a longitudinal cross-sectional view of the negative-pressure generator of the first embodiment.

30 indicates a negative pressure generator which is provided at the lowermost downstream of the exhaust system pipe 20. This generator has an accelerating portion 31 which throttles the exhaust gas channel and thereby raises the passing flow rate in the conduit line and a negative-pressure chamber 32 provided around the accelerating portion for utilization of the negative pressure generated by this accelertion. It is best to form the structure of the accelerating part with a choke pipe having a throat such as a venturi pipe or a Laval nozzle. A sample embodiment is described later with reference to FIGS. 3 and 4. 23 indicates a tail pipe.

40 is a turbine on the driving side that corresponds to the exhaust turbine used to drive a conventional turbo-supercharger.

In the present invention, the turbine is mainly driven by the negative pressure generating 30.

Figure 2:
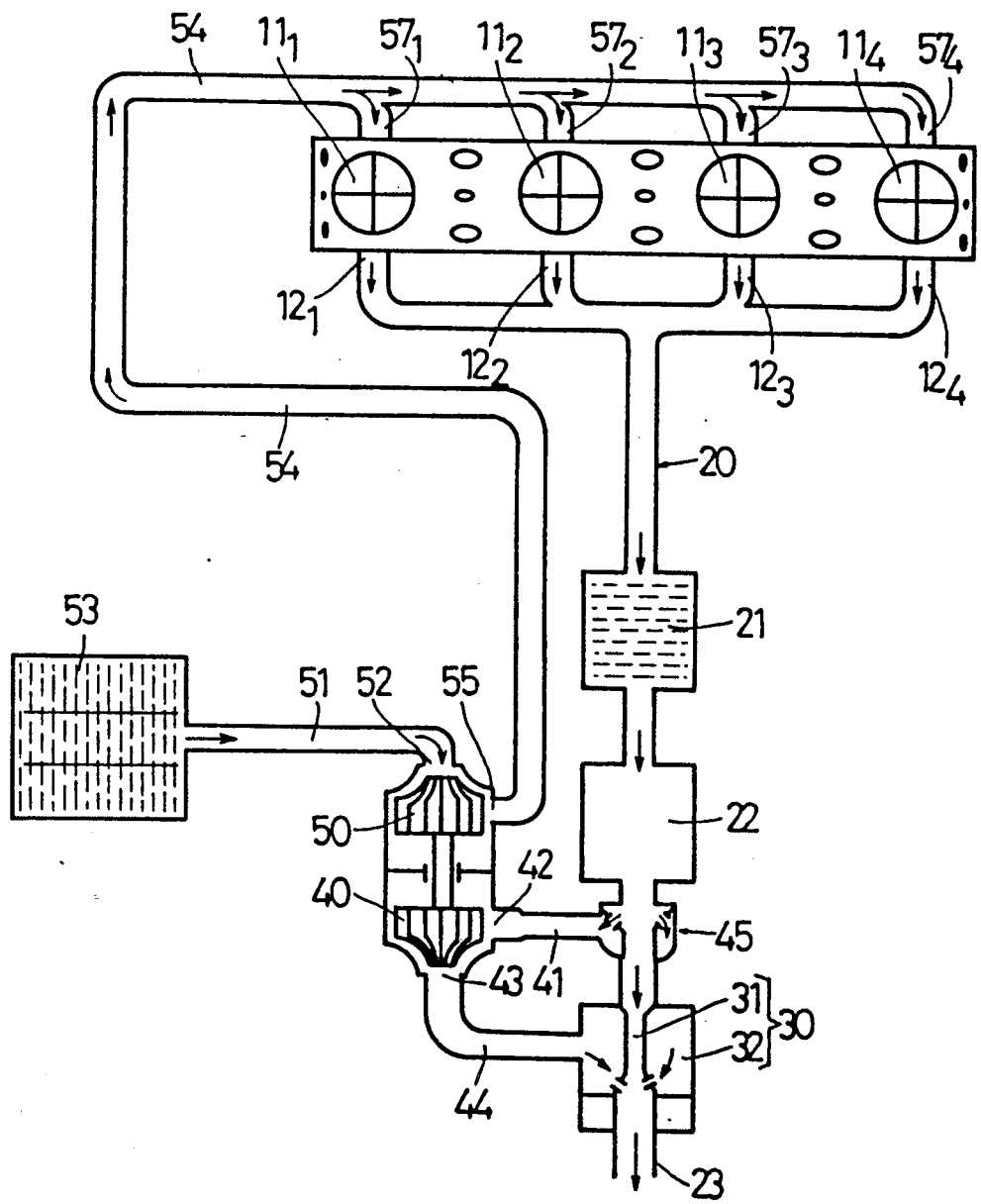
FIG. 2 is a schematic drawing of the second embodiment.

41 is the introductory pipe connecting the exhaust system tube 20 and the turbine inlet 42, and 43 indicates a suction pipe connecting the negative-pressure chamber 32 of the negative-pressure generator 30 and the turbine outlet 44. The inlet pipe 41 may be connected to the exhaust system pipe 20, in the case of the sample embodiment shown in FIG. 1. However, an auxiliary accelerating means 45 is also indicated in FIG. 2. That is to say, FIG. 1 shows an example of direct coupling, whereas FIG. 2 shows an example of auxiliary acceleration. In the case of FIG. 2, the connecting position to the exhaust system pipe 20 is located downstream from the muffler 22 and shows an example of previous acceleration of a stream of which kinetic energy has been greatly attenuated. In account of the position immediately before or after the exhaust muffler 22, although the kinetic energy of the exhaust gas flow is reduced to as low as the square of the speed ratio of the kinetic energy usable in the case of the exhaust turbine, the exhaust gas temperature is also lowered remarkably due to adiabatic expansion. The turbine 40 does not need to take heat resistance into account.

50 is a supercharging turbine driven by the driving turbine 40. 51 is a mounting pipe to introduce the outside air to the turbine inlet 52. 53 is the air filter for this pipe. 54 indicates a suction pipe to deliver suction air from the turbine outlet 55 via an intercooler 56 (FIG. 1) or directly to suction ports $57_1$, $57_2$, $57_3$, $57_4$. In the present invention, the intercooler 56 to cool down the suction air is not required (FIG. 2). However, when it is used the effect of the intercooler is greater than when an exhaust turbine is used and accordingly the charging efficiency is markedly improved.

The negative pressure generator, which is used for both sample embodiments described above, is assembled into the muffler as in FIG. 3. This generator has a connection opening 61 for the exhaust system pipe 20, is provided at the central part with a flow channel 63 whose diameter is narrowed at a tapered portion 62, is composed of a muffling material 67 between the external cylinder 66 and the central cylinder 65 with openings 64 on the surface of the central cylinder. The lowermost downstream end of the central cylinder 65 is connected to the accelerating portion and the exhaust gas undergoes a muffling effect and flows out of the main flow channel outlet 68 and reaches the negative pressure generator 30.

Figure 4:
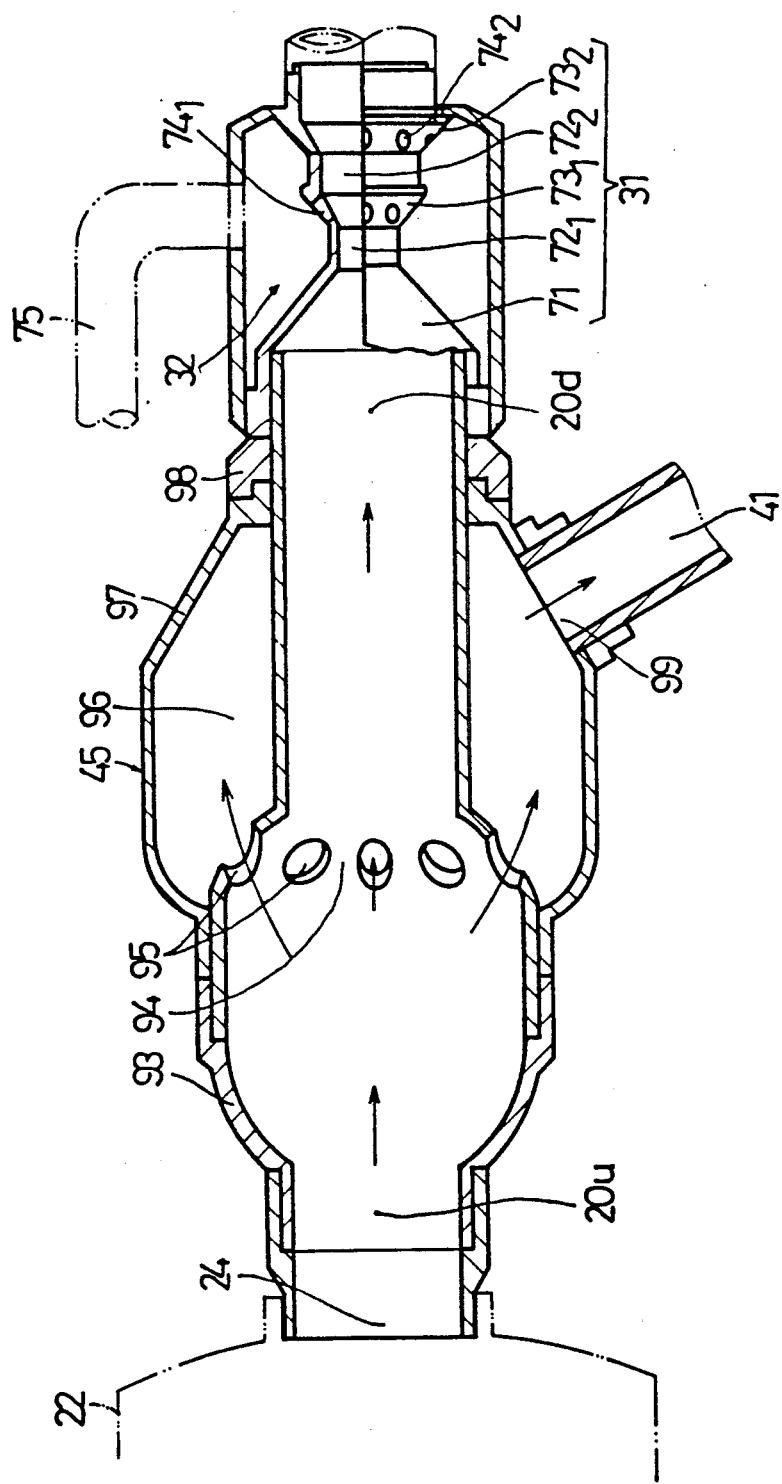
FIG. 4 is a view similar to FIG. 3 of the second embodiment.

The negative pressure generator 30 is located furthest downstream of the load resistance, and is equipped with an accelerating portion 31 consisting of a throttling pipe 71 connected to the aforementioned outlet 68, a throat pipe 72, and an expansion pipe 73 to accelerate the exhaust gas flow and thereby form a powerful negative pressure. The generator is designed to produce negative pressure by means of the negative pressure in the negative-pressure chamber 32 connected to air-introducing openings 74 which are provided immediately after the accelerating portion 31. The air flow is sucked in via a connecting pipe 75 which is connected to the rear part of an external cylinder surrounding it. The accelerating portion, as shown in FIG. 4, may have two stages, or it may have more than three stages. The capacity $V_1$ of the accelerating throat pipe 72 is set by the throttling pipe 71 to a capacity needed to obtain an exhaust flowrate. In the case of the sample embodiment that has multiple-step acceleration (shown in FIG. 4), the capacity $V_2$ of the second throat $72_2$ is enlarged in connection with the capacity $V_1$ of the first throat pipe $72_1$ so that a relationship of $V_2 = AV_1$ (A = approx. 2) can be maintained. Naturally, this coefficient A, can have any value. The inner diameter of the tail pipe 23 is larger than the inner diameter of the final accelerating portion, and as for each air introducing inlet 74, $74_1$, and $74_2$ it is better to provide a lead angle of $\theta$. This lead angle $\theta$ is greater than 0° and smaller than 90°, preferably within a range of 10° to 45°.

Between the connection pipe 75 and the suction pipe 43 is a muffler 80 on the suction side. This absorbs noise from the exhaust gas flow and controls the flowrate of the exhaust gas being taken in and flowing into the negative-pressure chamber 32. 81 is the connection opening for the suction pipe 43, 82 is a tapered portion, 83 are central flow channel, 84 is a muffling holes 85 is a muffling material between an external cylinder 87 and a central cylinder 86, 88 is a control chamber at a terminal and of the central cylinder and has a mobile valve 89 which adjusts the flow rate of the exhaust gas absorbed via the suction pipe 75 into the negative pressure chamber 32. 90 is a small hole in the movable valve, 91 is a shaft to mount the mobile valve, and 92 is a support for this shaft.

The auxiliary accelerating means, as shown in FIG. 4, consists of an expansion pipe 93 which is connected at its upstream side 20u to the connecting tube 24 to the exhaust muffler 22. The accelerating means also has a throttle pipe 94 whose inner diameter is reduced further, suction ports 95 open to the tapered throttle portion of the pipe 94, an accelerating chamber material 97 which forms a suction chamber 96 covering the outer periphery of throttle pipe 94 including the suction ports 95, and a connection means 98 to part 20d on the downstream side of the exhaust system pipe 20. Intake pipe 41 is connected to the acceleration chamber material 97 so that the turbine exhaust flow can be absorbed externally via the suction ports 95, and 99 shows the connection port. The reason for having arranged the suction ports 95 externally in relation with the exhaust gas flow arises from effective absorption and discharge of the exhaust gas flow.

Because the equipment of the present invention has the structure described above, while the flow of exhaust gas that is ejected, by operating the internal combustion engine 10 at a high speed, from each of the combustion chambers 11$_1$–11$_4$, into the system pipe 20, through the catalytic device 21, the exhaust muffler 22, and the negative-pressure generator 30, a powerful negative pressure is generated and its energy is utilized to drive the driving turbine 40. And while the exhaust gas flows out of the exhaust pipes 12$_1$–12$_4$ and passes through the afore-mentioned loads, its kinetic energy is reduced remarkably, and at the same time, its temperature decreases significantly.

The exhaust gas flow with reduced energy recovers its flow rate while it passes through the accelerating portion 31 of the negative-pressure generator 30. Because the speed of gas flow increases, it becomes possible to utilize a high degree negative pressure arising therefrom at the negative pressure chamber. Therefore, the turbine 40 connecting to the chamber 32 via the suction pipe 43 is absorbed and driven by the negative pressure. Moreover, the upstream exhaust gas flow is absorbed via the introductory pipe 41. At this time, the exhaust gas flow which is introduced to the turbine inlet 42 is attenuated as described before and enters in the state of a reduced flowrate. However, in comparison with the static or quasi-static outside air, the gas flow still has available kinetic energy, and therefore the turbine output commensurately with the available kinetic energy or the suction force needed to operate the turbine decrease in proportion thereto. As a result, the utilization efficiency of the exhaust gas energy increases, accordingly.

Thus, the driving turbine 40 operates and drives the supercharging turbine 50, and the inhaled gas is delivered forcibly through the suction pipe 54 to each of the suction ports 57$_1$–57$_4$. Since this supercharged air is at a low temperature, the suction gas is charged into the cylinder at a charging efficiency corresponding to a supercharging degree.

In accordance with the present invention, therefore, the turbine is driven by a negative pressure generated by accelerating the exhaust gas flow. At the same time, it is designed so that the exhaust gas flow—though already attenuated but still having some kinetic energy—can be introduced to the exhaust gas turbine. It is possible to efficiently drive the supercharging turbine then to introduce the quasi-static air flow from the atmospheric air to the engine. Moreover, because the residual energy is utilized downstream from the exhaust system, the present invention is free from the negative effect of a high temperature immediately after exhaustion. And since the supercharge suction air is at a low temperature, the suction air charged into the combustion chambers has a high density, and therefore the charging efficiency can be improved sharply.

I claim:

1. Turbosupercharger apparatus for an internal combustion engine having at least one combustion chamber, inlet and outlet means for said at least one combustion chamber, and an exhaust gas system connected to said outlet means of said at least one combustion chamber comprising:

a negative pressure generator proximate said downstream end of said exhaust system pipe for accelerating the exhaust gas flow and generating a negative pressure produced by said acceleration;

a driving turbine having an inlet and an outlet;

a compressor operatively connected to said driving turbine for being driven thereby and having an inlet and an outlet;

duct means for connecting said turbine inlet to said exhaust system pipe at a position of said pipe where said exhaust gas flow has been attenuated for feeding said exhaust gas flow to said turbine for driving said turbine;

suction pipe means connecting said turbine outlet to said negative pressure generator;

means for feeding ambient air to said compressor inlet; and means for feeding said air from said compressor outlet to said at least one combustion chamber of said engine.

2. The turbosupercharger apparatus as claimed in claim 1 wherein:

an exhaust muffler means is provided in said exhaust system pipe; and said turbine inlet duct means is connected to said exhaust system pipe upstream of and adjacent to said exhaust muffler means.

3. The turbosupercharger apparatus as claimed in claim 1 wherein:

an exhaust muffler means is provided in said exhaust system pipe; and said turbine inlet duct means is connected to said exhaust system pipe downstream of and adjacent to said exhaust muffler means.

4. The turbosupercharger apparatus as claimed in claim 1 and further comprising:

an auxiliary accelerating means in said exhaust system pipe having an accelerated gas flow outlet means, said turbine inlet duct means being connected to said exhaust system pipe by said outlet means of said auxiliary accelerating means.

* * * * *